(12) United States Patent
Bates

(10) Patent No.: US 11,169,913 B2
(45) Date of Patent: *Nov. 9, 2021

(54) MOCK SERVER FOR TESTING

(71) Applicant: INTUIT INC., Mountain View, CA (US)

(72) Inventor: Garrett Bates, Mountain View, CA (US)

(73) Assignee: INTUIT, INC., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/792,451

(22) Filed: Feb. 17, 2020

(65) Prior Publication Data

US 2020/0183822 A1 Jun. 11, 2020

Related U.S. Application Data

(63) Continuation of application No. 16/112,446, filed on Aug. 24, 2018, now Pat. No. 10,565,098, which is a
(Continued)

(51) Int. Cl.
*G06F 9/445* (2018.01)
*G06F 11/36* (2006.01)
(Continued)

(52) U.S. Cl.
CPC .......... *G06F 11/3696* (2013.01); *G06F 9/451* (2018.02); *G06F 11/3612* (2013.01);
(Continued)

(58) Field of Classification Search
CPC ............ G06F 11/3696; G06F 11/3612; G06F 11/3664; G06F 11/3688; G06F 9/451;
(Continued)

(56) References Cited

U.S. PATENT DOCUMENTS 7,210,121 B2 4/2007 Xia et al.
7,945,683 B1 5/2011 Ambrose et al.
(Continued)

OTHER PUBLICATIONS

Neha Singhal et al., Automock: Automated Mock Backend Generation for Javascript based Applications, vol. 16 Issue 7 Version 1.0, 2016, [Retrieved on Jan. 28, 2021], Retrieved from the internet: <URL: https://computerresearch.org/index.php/computer/article/view/1484/1471 > 9 Pages (1-9) (Year: 2016).*
(Continued)

*Primary Examiner* — Anibal Rivera
(74) *Attorney, Agent, or Firm* — Patterson + Sheridan, LLP

(57) ABSTRACT

Systems of the present disclosure provide a versatile, reusable mock server to respond to Application-Programming-Interface (API) requests. The mock server receives an API request and a cookie associated with the API request. The API server identifies response instructions found in the cookie. The response instructions may include a static response value, a name of an API server for the mock server to imitate, or code for the mock server to execute in the process of generating a mock API response. The mock server generates a mock API response based on the response instructions and sends the mock API response in reply to the API request.

20 Claims, 7 Drawing Sheets

Related U.S. Application Data continuation of application No. 15/411,779, filed on Jan. 20, 2017, now Pat. No. 10,089,219.

(51) Int. Cl.

| | | |
|---|---|---|
| *G06F 9/44* | (2018.01) | |
| *H04L 29/08* | (2006.01) | |
| *G06F 9/451* | (2018.01) | |
| *H04L 12/26* | (2006.01) | |
| *H04L 12/24* | (2006.01) | |
| *G06F 9/448* | (2018.01) | |
| *G06F 16/21* | (2019.01) | |
| *G06F 16/957* | (2019.01) | |
| *G06F 9/54* | (2006.01) | |

(52) U.S. Cl.
CPC ...... *G06F 11/3664* (2013.01); *G06F 11/3688* (2013.01); *H04L 41/145* (2013.01); *H04L 43/50* (2013.01); *H04L 67/146* (2013.01); *H04L 67/16* (2013.01); *G06F 9/445* (2013.01); *G06F 9/449* (2018.02); *G06F 9/4486* (2018.02); *G06F 9/541* (2013.01); *G06F 9/547* (2013.01); *G06F 11/3672* (2013.01); *G06F 11/3684* (2013.01); *G06F 11/3692* (2013.01); *G06F 16/21* (2019.01); *G06F 16/9574* (2019.01)

(58) Field of Classification Search
CPC .............. G06F 9/4486; G06F 11/3692; G06F 11/3672; G06F 11/3684; G06F 9/547; G06F 9/541; G06F 9/449; G06F 9/445; G06F 9/45537; G06F 16/21; G06F 16/9574; H04L 41/145; H04L 43/50; H04L 67/146; H04L 67/16
See application file for complete search history.

(56) References Cited

U.S. PATENT DOCUMENTS

| | | | |
|---|---|---|---|
| 7,971,090 B2 | 6/2011 | Nan et al. | |
| 8,626,827 B1* | 1/2014 | Cabrera | H04L 41/145 709/203 |
| 8,935,418 B2 | 1/2015 | Knouse et al. | |
| 9,477,584 B2* | 10/2016 | Hong | G06F 11/3688 |
| 9,558,307 B1* | 1/2017 | Yanai | G06F 30/30 |
| 9,715,421 B2 | 7/2017 | Nandakumar et al. | |
| 9,959,198 B1* | 5/2018 | Jha | G06F 11/3664 |
| 10,305,962 B1* | 5/2019 | Skowronski | H04L 43/50 |
| 10,412,022 B1* | 9/2019 | Tang | H04L 41/0896 |
| 2003/0158889 A1 | 8/2003 | Massarani et al. | |
| 2004/0158813 A1 | 8/2004 | Xia et al. | |
| 2005/0027853 A1* | 2/2005 | Martin | G06F 11/3495 709/224 |
| 2007/0038979 A1* | 2/2007 | Oral | G06F 9/4486 717/108 |
| 2008/0010074 A1* | 1/2008 | Brunswig | G06Q 10/06 717/108 |
| 2008/0114875 A1 | 5/2008 | Anastas et al. | |
| 2008/0127097 A1 | 5/2008 | Zhao et al. | |
| 2009/0083578 A1 | 3/2009 | Nan et al. | |
| 2009/0089131 A1 | 4/2009 | Moukas et al. | |
| 2009/0199210 A1 | 8/2009 | Smith, Jr. | |
| 2011/0214163 A1 | 9/2011 | Smith et al. | |
| 2013/0007520 A1 | 1/2013 | Giammarresi et al. | |
| 2013/0067432 A1* | 3/2013 | Feies | G06F 8/38 717/107 |
| 2013/0132854 A1 | 5/2013 | Raleigh et al. | |
| 2014/0006858 A1 | 1/2014 | Helfman et al. | |
| 2014/0052548 A1 | 2/2014 | Dokken, Jr. | |
| 2014/0298361 A1 | 10/2014 | Cussonneau et al. | |
| 2015/0121462 A1 | 4/2015 | Courage et al. | |
| 2016/0092344 A1* | 3/2016 | Bally | G06F 11/3684 717/124 |
| 2016/0191554 A1 | 6/2016 | Kaminsky | |
| 2016/0217159 A1 | 7/2016 | Dahan et al. | |
| 2016/0224336 A1* | 8/2016 | Zhou | G06F 8/36 |
| 2016/0378439 A1 | 12/2016 | Straub et al. | |
| 2017/0054571 A1 | 2/2017 | Kitchen et al. | |
| 2017/0060653 A1 | 3/2017 | Nandakumar et al. | |
| 2017/0063597 A1* | 3/2017 | Kelly | G06F 11/3006 |
| 2017/0118037 A1 | 4/2017 | Kitchen et al. | |
| 2017/0300402 A1* | 10/2017 | Hoffner | G06F 11/3664 |
| 2017/0344971 A1 | 11/2017 | Kargman et al. | |
| 2018/0081702 A1* | 3/2018 | Cohen | G06F 8/36 |
| 2018/0129592 A1* | 5/2018 | Li | G06F 11/3684 |
| 2019/0095560 A1* | 3/2019 | Lewis | G06F 9/4856 |
| 2019/0199750 A1* | 6/2019 | Chen | H04L 41/22 |

OTHER PUBLICATIONS

Hesam Samimi et al., Declarative Mocking, Jul. 15-20, 2013, [Retrieved on Sep. 7, 2021], Retrieved from the internet: <URL: https://dl.acm.org/doi/pdf/10.1145/2483760.2483790> 11 Pages (246-256) (Year: 2013).*

Simin Holm Jensen et al., Modeling the HTML DOM and browser API in static analysis of JavaScript web applications, Sep. 5-9, 2011, [Retrieved on Jun. 26, 2018]. Retrieved from the internet: <URL: https://dl.acm.org/citation.cfm?id=2025125> 11 pages.

Johnnes Wurback, Development of a mobile payment service with focus on evaluating API recording for automated mocking, Jan. 23, 2013, [Retrieved on Jun. 26, 2018]. Retrieved from the internet: <URL:http://citeseerx.ist.psu.ed/viewdoc/download?doi=10. 1.1. 3809996&rep1&type=pdf>, 25 pages.

Takuji Narumi et al., Meta cookie, Jul. 26-30, 2010, [Retrieved on Nov. 13, 2019]. Retrieved from internet: <URL: https://dl.acm.org/citation.cfm?id=1836839> 1 Page (1) (Year: 2010).

Anderson A. L. Queiroz et al., Breach of internet provacy through the use of cookies, Jun. 23-25, 2010, [Retrieved on Nov. 12, 2019]. Retrieved from the internet: <URL:https://dl.acm.org/citation.cfm?id=1839378> 5 Pages (1-5) (Year: 2010).

James Bloom, MockServer, 2013, [Retrieved on Jun. 22, 2019]. Retrieved from the internet: <http://www.mock-server.com/> 8 pages (1-8) (Year: 2013).

* cited by examiner

302A

```
{
  "request": {
    "urlPathPattern": ".*\/access_client\/sign_in.*",
    "method": "POST"
  },
  "response": {
    "status": 500
  }
}
```

304A document.cookie = "ims-stub=%7B%0A%20%20%22request%22%3A%20%7B%0A%20%20%20%20%22urlPathPattern%22%3A%20%22.*%5C%2Faccess_client%5C%2Fsign_in.*%22%2C%0A%20%20%20%20%22method%22%3A%20%22POST%22%0A%20%20%7D%2C%0A%20%20%22response%22%3A%20%7B%0A%20%20%20%20%22status%22%3A%20500%0A%20%20%20%20%7D%0A%7D;path=/access_client/sign_in"

FIG. 3A document.cookie = "ims-proxy-host=https://accounts.intuit.com;path=/"

document.cookie = "ims-transformer=Thread.sleep(3000);path=/access_client/sign_in"

MOCK SERVER FOR TESTING

CROSS-REFERENCE TO RELATED APPLICATIONS

This Application is a continuation of co-pending U.S. patent application Ser. No. 16/112,446, filed Aug. 24, 2018, now U.S. Pat. No. 10,565,098, which is a continuation of U.S. patent application Ser. No. 15/411,779, filed Jan. 20, 2017, now U.S. Pat. No. 10,089,219, the contents of each of which are incorporated herein in their entirety.

BACKGROUND

Field

Embodiments presented herein generally relate to mock server systems. More specifically, techniques are disclosed for a mock server that responds to API calls.

Related Art

Application programming interfaces (APIs) generally expose various routines and methods to software developers for use in obtaining and modifying data using features of a software application. These APIs may be accessible programmatically (e.g., as function calls programmed in an application or function library) or via a web resource for web-based applications. Web-based applications can invoke functionality exposed by an API, for example, using a Representational State Transfer function call (a REST call), queries in an HTTP POST request, a Simple Object Access Protocol (SOAP) request, or other protocols that allow client software to invoke functions on a remote system.

Programmers often write code that integrates with other components via APIs. During the development process, however, these components may not yet be available or may be unsuitable for testing use for other reasons. Therefore, software development teams sometimes set up mock servers to simulate external API components. Developers can configure a mock API service to respond to API requests in a way that simulates an actual API service. Furthermore, developers can configure the mock API service to facilitate testing. For example, developers can include "stubs" in the mock API service that define how the mock API service should respond to API requests that meet specified criteria.

SUMMARY

One embodiment of the present disclosure includes a method for a mock server to respond to Application-Programming-Interface (API) requests. The method generally includes receiving, at the mock server, an API request and one or more cookies associated with the API request; parsing the one or more cookies to identify response instructions; generating a mock API response based on the response instructions; and sending the mock API response in reply to the API request.

Another embodiment provides a computer-readable storage medium having instructions, which, when executed on a processor, perform an operation for a mock server to respond to Application-Programming-Interface (API) requests. The operation generally includes receiving, at the mock server, an API request and one or more cookies associated with the API request; parsing the one or more cookies to identify response instructions; generating a mock API response based on the response instructions; and sending the mock API response in reply to the API request.

Still another embodiment of the present disclosure includes a processor and a memory storing a program which, when executed on the processor, performs an operation for a mock server to respond to Application-Programming-Interface (API) requests. The operation generally includes receiving, at the mock server, an API request and one or more cookies associated with the API request; parsing the one or more cookies to identify response instructions; generating a mock API response based on the response instructions; and sending the mock API response in reply to the API request.

BRIEF DESCRIPTION OF THE DRAWINGS

FIG. 3A illustrates a cookie that includes response instructions including a static value to return in a mock API response, according to one embodiment.

DETAILED DESCRIPTION

Figure 1:
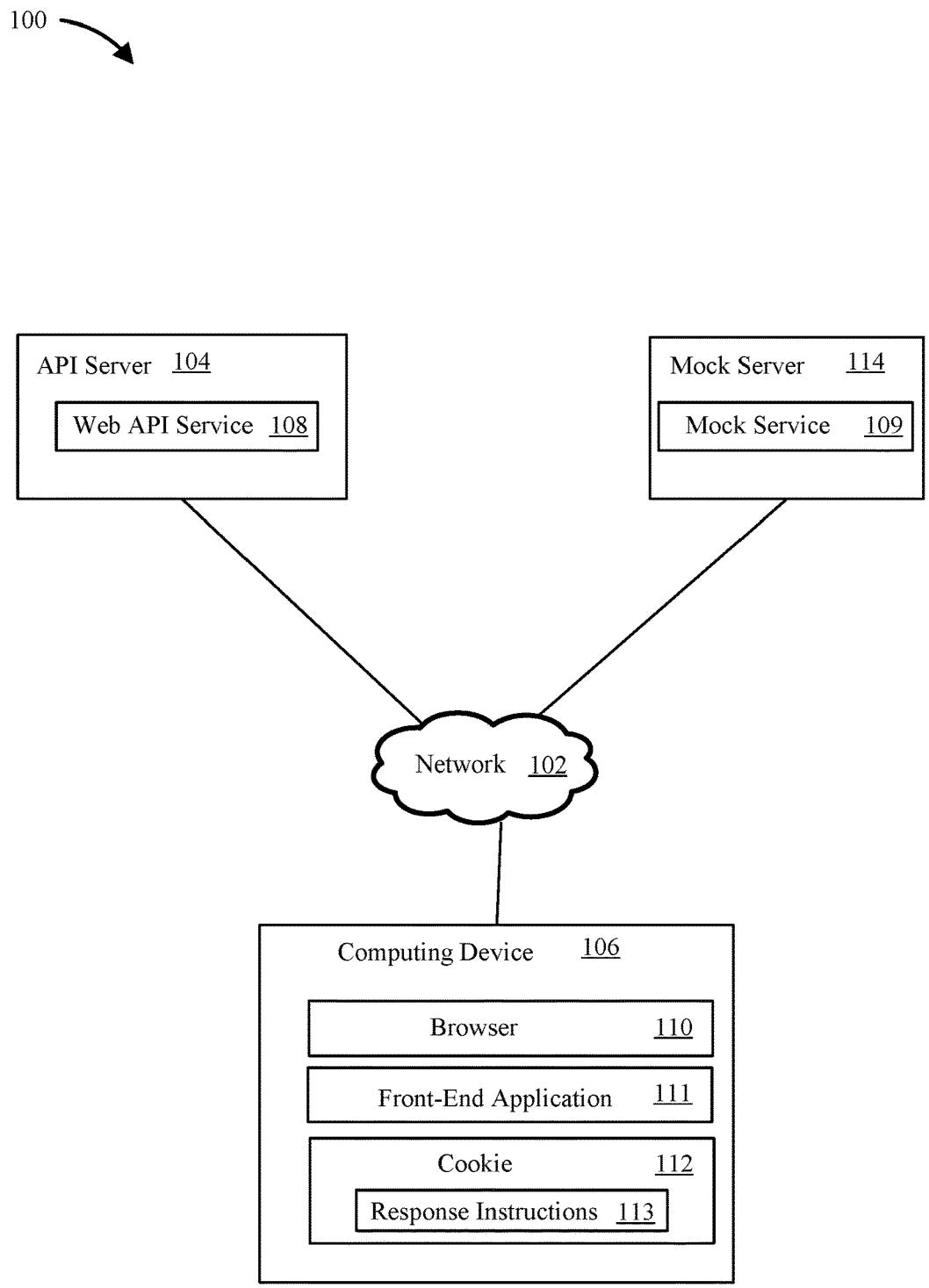
FIG. 1 illustrates a computing network environment wherein technology of the present disclosure can operate, according to one embodiment.

Existing mock API servers have some disadvantages. For example, setting up a mock API server that meets the needs of a given project takes time. In particular, if the developers want the mock server to execute code for a compiled language (e.g., Java or C++) as part of the process of generating an API response, the developers have to write and debug extensions for this purpose. Furthermore, two development teams typically cannot share a mock server because the teams may need the mock server to behave in contradictory ways under identical circumstances. For example, one team may want the mock server to return a status of "500" (indicating an internal error) for a request matching a condition, while the other team may want the mock server to return a status of "202" (indicating the request was accepted) for a request matching the same condition. For similar reasons, mock servers typically cannot be reused for different projects.

Embodiments presented herein provide techniques for a mock server to respond to Application-Programming-Interface (API) requests without depending on stubs or code stored at the mock server. Rather, the mock server determines how to respond to an API request by reading information included in a cookie (or multiple cookies). The cookie is stored in a browser at a client computing device. The client computing device sends the cookie to the mock server along with the API request. Since the response from the mock server determines the response based on information in the cookie instead of information stored at the mock server, a developer on the client side can ensure the mock server returns a desired response to an API request by editing the cookie at the client computing device. Hence, there is no need to manipulate settings or code at the mock server when the developer wants the mock server to return a different response to the API request. In one embodiment, a mock server receives an API request and a cookie. The API server identifies instructions in the cookie. The instructions may include a static response value, identify an API server for the mock server to imitate, or include code for the mock server to execute to generate a response. The mock server generates a response based on the response instructions and sends the response in reply to the API request.

By using cookies to determine how to respond to API request, a mock API service can be used by multiple development teams—even if those teams want the mock API service to return different responses to identical API requests. Furthermore, embodiments of the present disclosure provide a mock API service that can be reused without requiring configuration changes.

For example, suppose a first user wants to test how a front-end application will react if an HTTP status of 200 is received in reply to an API request. The first user writes a stub specifying a mock server is to return an HTTP status of 200 for the API request and URL-encodes the stub in a first cookie. The first cookie is sent with the API request to the mock server. The mock server parses the first cookie and returns the HTTP status of 200 as requested in the first cookie.

Also suppose a second user wants to test how a front-end application will react if an HTTP status of 204 is received in reply to an identical API request. The second user writes a stub specifying a mock server is to return an HTTP status of 204 for the API request and URL-encodes the stub in a second cookie. The second cookie is sent with the API request to the mock server. The mock server parses the second cookie and returns the HTTP status of 204 as requested in the second cookie.

In another example, suppose a first user wants the mock server to imitate a first API server when responding to an API request. The first user specifies the first API server in a first cookie. The first cookie is sent with the API request to the mock server. The mock server parses the first cookie, forwards the API request to the first API server, receives a response from the first API server, and sends the response in reply to the API request as requested in the first cookie.

Also suppose a second user wants the mock server to imitate a second API server when responding to an identical API request. The second user specifies the second API server in a second cookie. The second cookie is sent with the API request to the mock server. The mock server parses the second cookie, forwards the API request to the second API server, receives a response from the second API server, and sends the response in reply to the API request as requested in the second cookie.

In another example, suppose a first user wants the mock server to wait for three seconds before returning a response to an API request. The first user includes Java code instructing the mock server to sleep for three seconds in a first cookie. The first cookie is sent with the API request to the mock server. The mock server parses the first cookie and executes the code. After waiting three seconds as specified in the code, the mock server sends a response to the API request (e.g., based on other instructions in the cookie).

Also suppose a second user wants the mock server to wait for five seconds before returning a response to an identical API request. The second user includes Java code instructing the mock server to sleep for five seconds in a second cookie. The second cookie is sent with the API request to the mock server. The mock server parses the second cookie and executes the code. After waiting five seconds as specified in the code, the mock server sends a response to the API request (e.g., based on other instructions in the cookie).

FIG. 1 illustrates a computing network environment 100 wherein technology of the present disclosure can operate, according to one embodiment. As shown, the environment 100 includes a computing device 106, an application programming interface (API) server 104, and a mock server 114. The API server 104 provides web API service 108. The web API service 108 can receive an API request from the front-end application 111 (e.g., for a web application) executing in the browser 110. The web API service 108 determines an appropriate API response to the API request and sends the API response to the browser 110. Upon receiving the API response, the browser 110 continues executing the front-end application 111.

Suppose a developer wants to test how the front-end application 111 behaves when a specific type of API response is received in reply to an API request. In one embodiment, the front-end application 111 sends an API request to the mock server 114 instead of the API server 104 for testing purposes. The browser 110 also sends the cookie 112 with the API request to the mock server 114. The cookie 112 includes response instructions 113. The mock service 109 generates a mock API response to the API request based on the response instructions 113. The response instructions 113 may indicate how the mock service 109 is to behave in response to the API request and how the mock service 109 is to generate the mock API response in a number of ways.

In one example, the response instructions 113 include a stub that specifies a static value for the mock service 109 to return as the mock API response in reply to the API request. The stub, including the static value, may be Uniform-Resource-Locator (URL) encoded.

In another example, the response instructions 113 specify a proxy server—the API server 104, in this example—for the mock server 114 to mimic. The mock service 109 forwards the API request to the web API service 108. In reply, the web API service 108 sends a genuine API response to the mock service 109. The mock service 109, in turn, sends the genuine API response to the front-end application 111 executing in the browser 110.

In another example, the response instructions 113 include code for the mock service 109 to execute in the process of generating a mock API response to the API request. The code may be written in a compiled programming language (e.g., Java or C++) and may be URL-encoded. The code may serve a number of different purposes. For example, the code may invoke a "sleep" function that causes the mock service 109 to wait for a specified period of time (e.g., several seconds) before sending the mock API response to test how the front-end application 111 handles delayed responses. In another example, the code may be a function used to generate the mock API response (e.g., based on current values of environment variables at the mock server 114). In another example, the code may be used to transform a static value (e.g., provided in a stub in the response instructions 113) or a genuine API response (e.g., from the web API service 108) into a specified format to create the mock API response. The mock service 109 then sends the mock API response to the front-end application 111 in the specified format.

Figure 2:
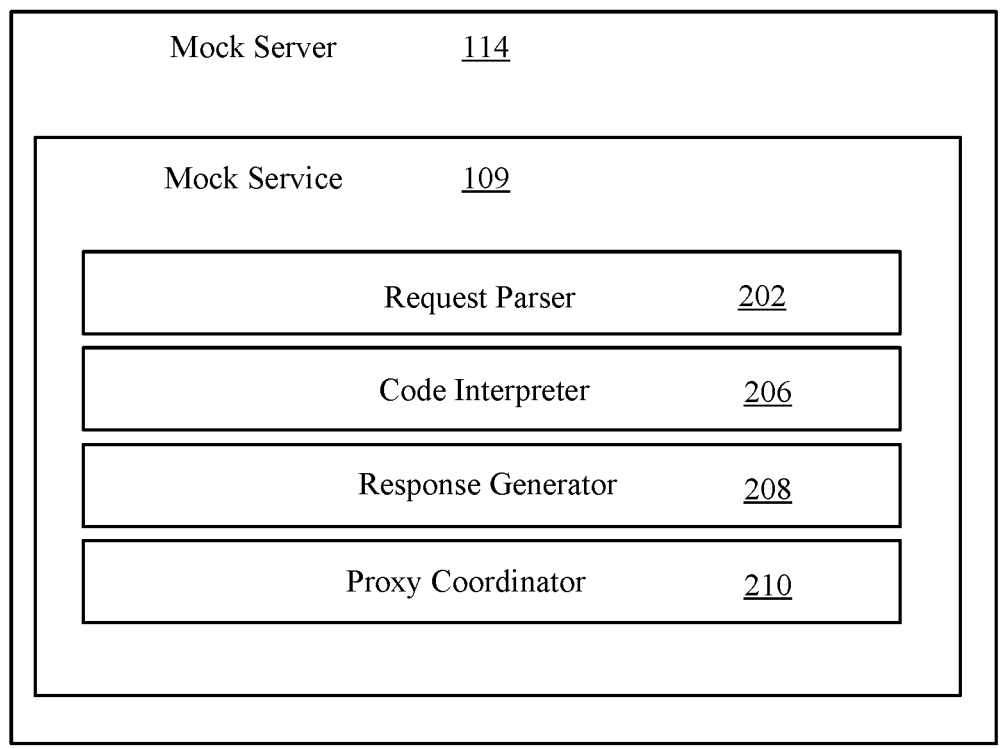
FIG. 2 illustrates a detailed view of a mock service, according to one embodiment.

FIG. 2 illustrates a detailed view of the mock service 109, according to one embodiment. As shown, the mock service 109 includes a request parser 202, a code interpreter 206, a response generator 208, and a proxy coordinator 210.

When the mock server 114 receives an API request and an associated cookie for the mock service 109, the request parser 202 identifies and parses response instructions found in the cookie. The response instructions dictate how the response generator 208 will go about creating a mock API response to the API request. For example, if the response instructions specify a static value, the response generator 208 sends the static value in reply to the API request if the response instructions so indicate. If the response instructions 113 specify an API server to imitate, the response generator 208 signals the proxy coordinator 210 to forward the API request to the API server. The proxy coordinator 210 receives a genuine API response from the API server in response to the forwarded API request. The proxy coordinator 210 provides the genuine API response to the response generator 208. The response generator 208 can forward the genuine API response in reply to the API request if the response instructions so indicate.

If the response instructions include code to execute, the response generator 208 uses the code interpreter 206 to execute the code. If the code is in a compiled language, the code interpreter 206 may be an embeddable source interpreter with object scripting language features that allows the code to be dynamically interpreted. For example, if the code is written in Java, the code interpreter 206 can be a tool such as BeanShell.

The code, when executed, may perform a number of different tasks for the response generator 208. For example, the code may invoke a "sleep" function that causes the response generator 208 to wait several seconds before sending a mock API response in reply to the API request. The code may be a function used to generate the mock API response dynamically. The code may also be used to transform a static value (e.g., provided in the response instructions) or a genuine API response (e.g., from an API server specified in the response instructions) into a specified format to create the mock API response. The mock service 109 then sends the mock API response in the specified format in reply to the API request.

FIG. 3A illustrates a cookie 304A that includes response instructions including a static value to return in a mock API response, according to one embodiment. Stub 302A illustrates the response instructions in a non-URL-encoded format. As shown, stub 302A includes a URL path pattern ("urlPathPattern") defined by a regular expression (".*Vaccess_clientVsign_in.*"). Stub 302A indicates that, in reply to an API request matching the URL path pattern, a mock server is to send a hypertext-transfer-protocol (HTTP) status of 500 ("status": 500) as a mock API response ("response").

Cookie 304A illustrates how the response instructions appear after being URL-encoded. As shown, the cookie 304A specifies that a variable called "ims-stub" contains the URL-encoded response instructions. Cookie 304A is sent from a browser along with an API request to a mock server to inform the mock server how to respond to the API request. If the API request the cookie 304A accompanied matches the URL path pattern in the stub 302A, the mock server sends an HTTP status of 500 in reply to the API request.

Figure 3B:
FIG. 3B illustrates a cookie that includes response instructions specifying a proxy host to mimic, according to one embodiment.

FIG. 3B illustrates a cookie 302B that includes response instructions specifying a proxy host to mimic, according to one embodiment. The response instructions indicate that, in reply to an API request the cookie 302B accompanies, a mock server should send the genuine API response that a proxy host (https://accounts.intuit.com, as shown) would send in reply to the API request. Hence, in one embodiment, a mock server that receives an API request matching the specified path ("path=/", as shown) and accompanied by cookie 302B forwards the API request to the proxy host, receives the genuine API response from the proxy host, and sends the genuine API response in reply to the API request.

Figure 3C:
FIG. 3C illustrates a cookie that includes response instructions specifying Java code to execute, according to one embodiment.

FIG. 3C illustrates a cookie 302C that includes response instructions specifying Java code to execute, according to one embodiment. As shown, the response instructions found in the cookie 302C include a line of Java code ("Thread.sleep(3000);") for a variable called "ims-transformer." When a mock server receives an API request matching the path pattern ("path=/access client/sign in" as shown) accompanied by the cookie 302C, the mock server executes the line of Java code using BeanShell. In this example, executing the line of code causes the server to wait for 3,000 milliseconds (3 seconds).

Figure 4:
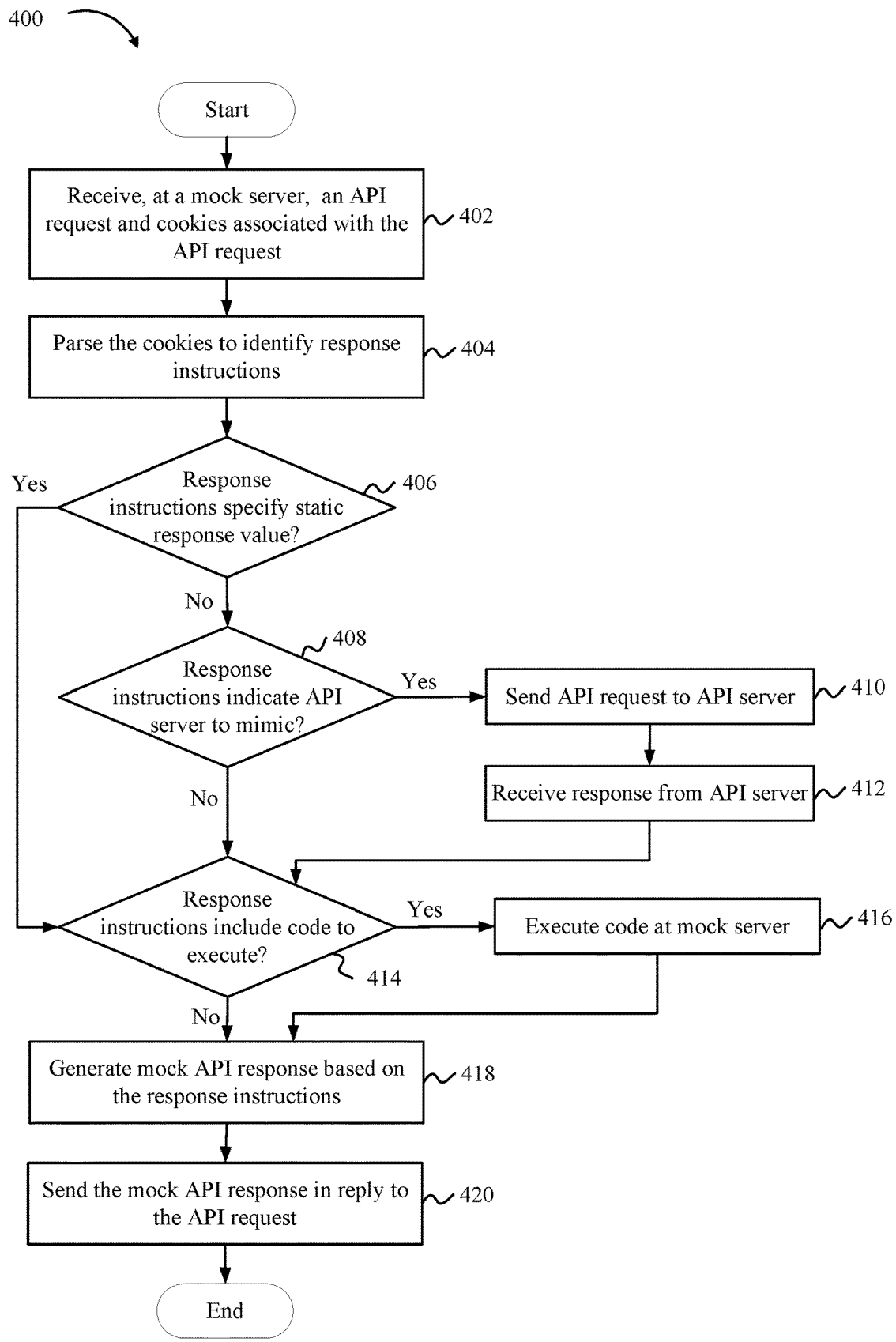
FIG. 4 illustrates a method for generating a response to an API request at a mock server, according to one embodiment.

FIG. 4 illustrates a method 400 for generating a response to an API request at a mock server, according to one embodiment. At step 402, the mock server receives an API request and cookies associated with the API request.

At step 404, the mock server parses the cookies to identify response instructions included in the cookies. The response instructions may include one or more of: a stub specifying a static response value, a proxy host for the mock server to imitate, or code for the mock server to execute. For example, in one embodiment, there are three cookies received with the API request: the ims-transformer cookie, the ims-stub cookie, and the ims-proxy-host cookie. In this embodiment, the ims-stub cookie would be used to specify a static response value, the ims-proxy-host cookie would be used to specify a proxy host for the mock server to imitate, and the ims-transformer cookie would be used to specify code for the mock server to execute.

At step 406, the mock server determines whether the response instructions specify a static response value. If so, the method 400 proceeds to step 414. If not, the method 400 proceeds to step 408. If present, the static response value dictates what the mock server will return (in step 420). If there is no code to execute (in step 416), the static response value may be returned as the API response (in step 420). However, if there is code to execute, the code may transform the static response value into a different format (e.g., from XML to JSON or vice versa).

At step 408, the mock server determines whether the response instructions indicate an API server to mimic. If not, the method 400 proceeds to step 414. If so, the method 400 proceeds to step 410.

At step 410, the mock server sends the API request to the API server. At step 412, the mock server receives a genuine API response from the server.

At step 414, the mock server determines whether the response instructions include code to execute. If so, the mock server executes the code (step 416). In some examples, the code is written in a compiled language and the mock server executes the code using an embeddable source interpreter (e.g., BeanShell). The code may include a delay instruction that causes the mock server to wait a specified period of time. Alternatively, the code helps determine what will be included in a mock API response based on parameters such as environment variables, a static response value identified in step 406, or a genuine API response received in step 412. In particular, the code may transform the static response value or the genuine API response into a different format. For example, if the genuine API response is in in XML format, the code may transform the response into Javascript Object Notation (JSON) format.

At step 418, the mock server generates a mock API response to the API request based on the response instructions.

At step 420, the mock server sends the mock API response in reply to the API request.

Figure 5:
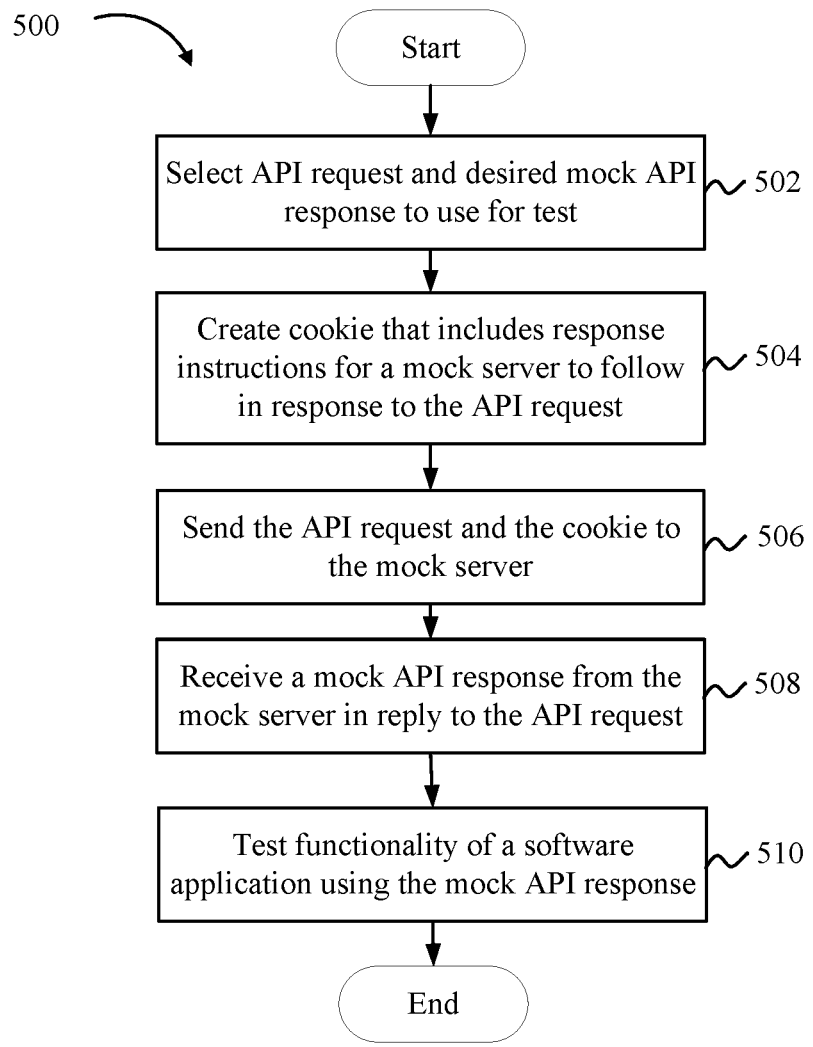
FIG. 5 illustrates a method for testing functionality of front-end code for a web application, according to one embodiment.

FIG. 5 illustrates a method 500 for testing a web application, according to one embodiment. At step 502, a user (e.g., a software developer) selects an API request and a desired mock API response (and mock server behavior) to test selected functionality of the application. For example, the user may choose to test how the application performs when a remote server sends an error message or sends a delayed response.

At step 504, a cookie that includes response instructions for a mock server to follow in response to the selected API request is created. For example, the response instructions may include values for variables the mock server uses in generating the mock API response. In one example, the cookie includes a static value for the mock server to return as the mock API response, such as an HTTP status code. In another example, the cookie includes a variable specifying a proxy host for the mock server to mimic. The cookie may also include code for the mock server to execute before sending a mock API response.

At step 506, a browser executing the front-end code sends the API request and the cookie to a mock server. The mock server follows the response instructions contained in the cookie to generate a mock API response and sends the mock API response to the browser.

At step 508, the browser receives the mock API response from the mock server in reply to the API request. Since the mock server generated the mock API response by following the response instructions included in the API request, the mock API response is tailored to test the functionality selected by the user for testing.

At step 510, the user tests functionality of the software application using the mock API response. For example, the user can verify whether the software application correctly displays an error message if the mock API response includes an HTTP error code. The user can also verify the software application does not crash or behave in some other undesirable way when the mock API response is received. In addition, the user can verify the software application correctly performs any processing steps that use the mock API response. Furthermore, if the cookie included code that caused the mock server to delay sending the mock API response, the user can verify the application behaves appropriately in light of the delay.

Figure 6:
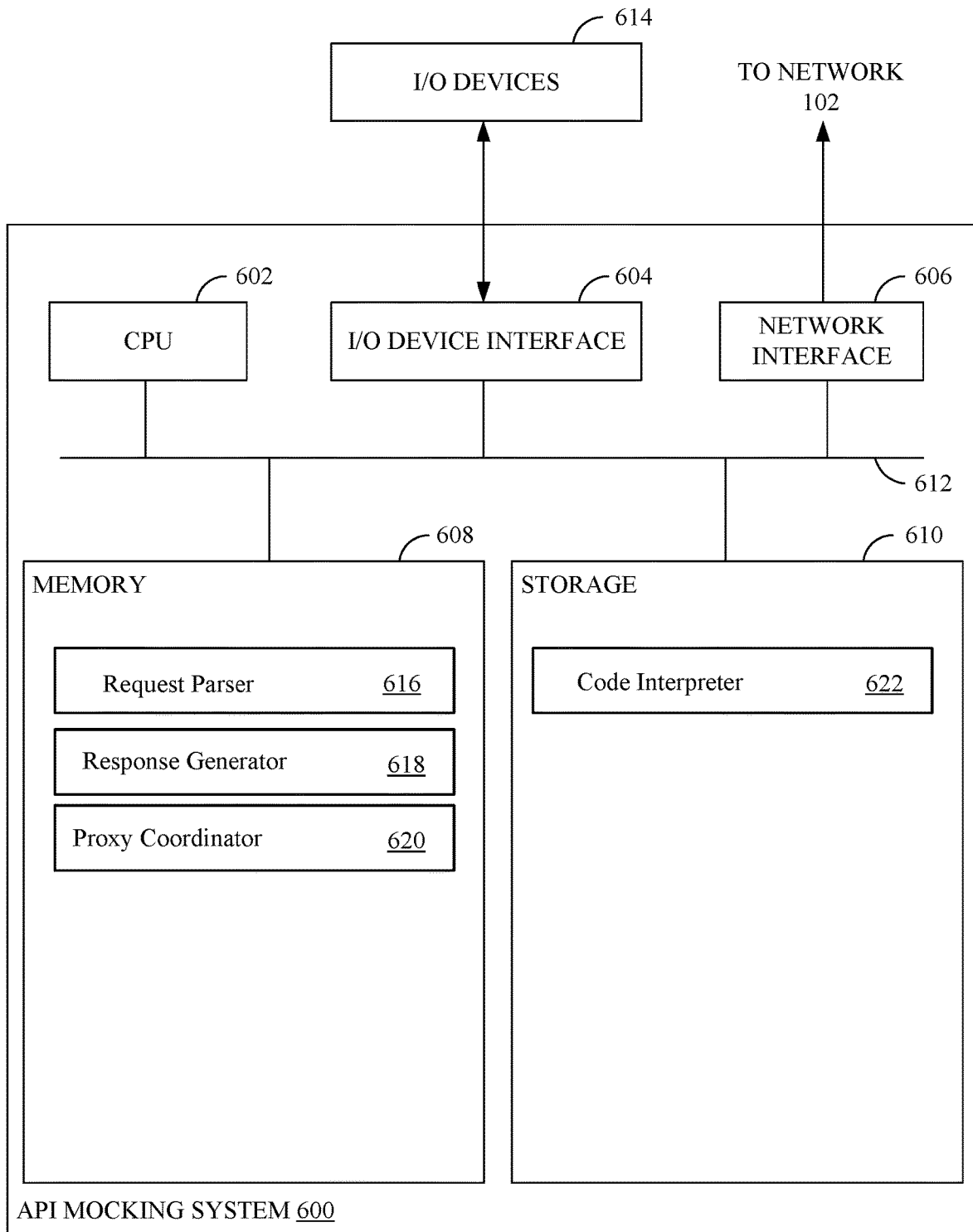
FIG. 6 illustrates an API mocking system that mocks API servers based on response instructions included in cookies, according to an embodiment.

FIG. 6 illustrates an API mocking system 600 that mocks API servers based on response instructions included in cookies, according to an embodiment. As shown, the API mocking system 600 includes, without limitation, a central processing unit (CPU) 602, at least one I/O device interface 604 which may allow for the connection of various I/O devices 614 (e.g., keyboards, displays, mouse devices, pen input, etc.) to the API mocking system 600, network interface 606, a memory 608, storage 610, and an interconnect 612.

CPU 602 may retrieve and execute programming instructions stored in the memory 608. Similarly, the CPU 602 may retrieve and store application data residing in the memory 608. The interconnect 612 transmits programming instructions and application data, among the CPU 602, I/O device interface 604, network interface 606, memory 608, and storage 610. CPU 602 can represent a single CPU, multiple CPUs, a single CPU having multiple processing cores, and the like. Additionally, the memory 608 represents random access memory. Furthermore, the storage 610 may be a disk drive. Although shown as a single unit, the storage 610 may be a combination of fixed or removable storage devices, such as fixed disc drives, removable memory cards or optical storage, network attached storage (NAS), or a storage area-network (SAN).

As shown, memory 608 includes request parser 616, response generator 618, and proxy coordinator 620. As shown, storage 610 includes code interpreter 622.

When the API mocking system 600 receives an API request and one or more an associated cookies, the request parser 616 parses the one or more cookies to identify response instructions. The response instructions inform the response generator 618 how to create a mock API response to the API request. For example, if the response instructions specify a static value to return as the mock API response, the response generator 618 sends the static value in reply to the API request. If the response instructions specify an API server to imitate, the response generator 618 signals the proxy coordinator 620 to forward the API request to the specified API server. The proxy coordinator 620 receives a genuine API response from the API server in response to the forwarded API request. The proxy coordinator 620 provides the genuine API response to the response generator 618. The response generator 618 sends the genuine API response as the mock API response in reply to the API request if the response instructions so indicate.

If the response instructions include code to execute, the response generator 618 uses the code interpreter 622 to execute the code. If the code is in a compiled language, the code interpreter 622 may be an embeddable source interpreter with object scripting language features that allows the code to be dynamically interpreted. For example, if the code is written in Java, the code interpreter 622 can be a tool such as BeanShell.

Note, descriptions of embodiments of the present disclosure are presented above for purposes of illustration, but embodiments of the present disclosure are not intended to be limited to any of the disclosed embodiments. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the preceding, reference is made to embodiments presented in this disclosure. However, the scope of the present disclosure is not limited to specific described embodiments. Instead, any combination of the following features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module," or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples a computer readable storage medium include: an electrical connection having one or more wires, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the current context, a computer readable storage medium may be any tangible medium that can contain, or store a program.

While the foregoing is directed to embodiments of the present disclosure, other and further embodiments of the disclosure may be devised without departing from the basic scope thereof, and the scope thereof is determined by the claims that follow.

What is claimed is:

1. A method for providing Application Programming Interface (API) responses, comprising:
   receiving, at a mock server, an API request comprising:
      response instructions indicating how the mock server is to respond to the API request; and
      a stub comprising a response value;
   generating an API response based on the response instructions, wherein generating the API response comprises:
      if the response instructions in the API request comprise executable code, executing the executable code to produce a transformed response value and including the transformed response value in the API response; or
      if the response instructions in the API request do not comprise executable code, including the response value in the API response; and
   sending the API response to a client device.

2. The method of claim 1, wherein the response instructions in the API request comprise executable code, and wherein the executable code causes the response value to be changed from a first format to a second format.

3. The method of claim 1, wherein the response instructions in the API request comprise executable code, and wherein generating the API response further comprises: executing the executable code to wait for a specified amount of time before sending the API response.

4. The method of claim 1, wherein the response instructions are encoded as parameters of a Uniform-Resource-Locator (URL).

5. The method of claim 1, further comprising:
   determining that the response instructions do not indicate an API server to mimic; and
   determining not to send the API request to the API server because the response instructions do not indicate the API server to mimic.

6. The method of claim 2, wherein causing the response value to be changed from the first format to the second format comprises a conversion between eXtensible Markup Language (XML) and Javascript Object Notation (JSON).

7. The method of claim 1, wherein the API response comprises a hypertext transfer protocol (HTTP) status.

8. A system, comprising:
   a memory storing executable instructions;
   a processor configured to execute the executable instructions and cause the system to perform a method for providing application programming interface (API) responses, the method comprising:
      receiving, at a mock server, an API request comprising:
         response instructions indicating how the mock server is to respond to the API request; and
         a stub comprising a response value;
      generating an API response based on the response instructions, wherein generating the API response comprises:
         if the response instructions in the API request comprise executable code, executing the executable code to produce a transformed response value and including the transformed response value in the API response; or
         if the response instructions in the API request do not comprise executable code, including the response value in the API response; and
      sending the API response to a client device.

9. The system of claim 8, wherein the response instructions in the API request comprise executable code, and wherein the executable code causes the response value to be changed from a first format to a second format.

10. The system of claim 8, wherein the response instructions in the API request comprise executable code, and wherein generating the API response further comprises: executing the executable code to wait for a specified amount of time before sending the API response.

11. The system of claim 8, wherein the response instructions are encoded as parameters of a Uniform-Resource-Locator (URL).

12. The system of claim 8, further comprising:
   determining that the response instructions do not indicate an API server to mimic; and
   determining not to send the API request to the API server because the response instructions do not indicate the API server to mimic.

13. The system of claim 9, wherein causing the response value to be changed from the first format to the second format comprises a conversion between eXtensible Markup Language (XML) and Javascript Object Notation (JSON).

14. A method for providing Application Programming Interface (API) responses, comprising:
   receiving, at a mock server, an API request comprising executable code and a stub comprising a response value;
   generating an API response by executing the executable code to produce a transformed response value, wherein the API response includes the transformed response value; and
   sending the API response to a client device.

15. The method of claim 14, wherein the executable code causes the response value to be changed from a first format to a second format.

16. The method of claim 14, wherein generating the API response further comprises: executing the executable code to wait for a specified amount of time before sending the API response.

17. The method of claim 14, wherein the API request comprises a Uniform-Resource-Locator (URL).

18. The method of claim 14, further comprising:
   determining that the response instructions do not indicate an API server to mimic; and
   determining not to send the API request to the API server because the response instructions do not indicate the API server to mimic.

19. The method of claim 14, wherein the API response comprises a hypertext transfer protocol (HTTP) status.

20. The method of claim 15, wherein causing the response value to be changed from the first format to the second format comprises a conversion between eXtensible Markup Language (XML) and Javascript Object Notation (JSON).

\* \* \* \* \*